(12) United States Patent
Roach et al.

(10) Patent No.: US 8,096,044 B2
(45) Date of Patent: Jan. 17, 2012

(54) VEHICLE SIDE GLASS SETTING APPARATUS

(75) Inventors: Jerald P. Roach, Brighton, MI (US); Jeffery L. Geill, Macomb, MI (US); David F. Hirschmann, Romeo, MI (US); Richard Kleinhoffer, Macomb Township, MI (US); Claude Bou-Waked, Washington Township, MI (US); Richard Holland, Jr., Lapeer, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 463 days.

(21) Appl. No.: 12/402,883

(22) Filed: Mar. 12, 2009

(65) Prior Publication Data

US 2009/0229116 A1 Sep. 17, 2009

Related U.S. Application Data

(60) Provisional application No. 61/035,753, filed on Mar. 12, 2008.

(51) Int. Cl.
*B23P 21/00* (2006.01)

(52) U.S. Cl. ........................................................ 29/709
(58) Field of Classification Search .................. 29/709, 29/714, 712, 720, 407.05, 407.04; 901/7, 901/9
See application file for complete search history.

(56) References Cited

U.S. PATENT DOCUMENTS

| 5,010,634 | A | * | 4/1991 | Uemura et al. ............ 29/407.05 |
| 5,380,978 | A | | 1/1995 | Pryor |
| 6,748,638 | B2 | | 6/2004 | Dedrich et al. |

\* cited by examiner

*Primary Examiner* — John C Hong
(74) *Attorney, Agent, or Firm* — Ralph E. Smith

(57) ABSTRACT

An apparatus for setting side glass in a convertible vehicle body, prior to assembly of a convertible top on the vehicle body, includes a fixture adapted to engage multiple convertible top locating points on the vehicle's header and rear decklid shelf. Sensors mounted on the fixture detect the position of the raised side glass relative to the locating points and provide relative position information to an assembly operator, for example, through use of LED arrays, whereby the assembly operator can quickly set the side glass to a target position with which to achieve a desired side glass engagement with the convertible top, upon subsequent assembly of the convertible top to the vehicle body.

5 Claims, 3 Drawing Sheets

VEHICLE SIDE GLASS SETTING APPARATUS

CROSS-REFERENCE TO RELATED APPLICATIONS

This application claims the benefit of U.S. Provisional Patent Application Ser. No. 61/035,753 filed Mar. 12, 2008, the disclosure of which is hereby incorporated by reference.

FIELD OF THE INVENTION

The invention relates generally to vehicle assembly setting fixtures, and, more particularly, to side glass setting or positioning fixtures for use in assembly of convertibles, i.e. vehicles with folding stowable roofs.

BACKGROUND OF THE INVENTION

A convertible, i.e., a vehicle with a folding stowable roof or top, may be sub-assembled in a manufacturing facility alongside fixed-roof vehicles on a common assembly line. A convertible body sub-assembly typically encompasses operations which are shared with fixed-roof vehicles, and therefore generally includes installation of the side-windows or "side glass," but not of the folding or rigid convertible top. A final assembly of the convertible, including installation of the convertible top, is typically completed on a separate and dedicated assembly line.

At final assembly, and with the convertible top installed on the vehicle body, the vehicle side windows are precisely positioned during an operation termed "glass setting" to assure a tight weather seal between the windows and the installed convertible top. Glass setting is typically performed by a number of assembly operators utilizing manual measurements combined with hand-held tool manipulation of side window adjustment screws. Thus, the glass setting operation is primarily accomplished by trial and error, starting with a baseline window set with the side glass in a raised position. The assembly operators proceed to check the fit of the side glass as it engages the installed convertible top, and makes iterative adjustments until a desired seal and window-to-top fit is achieved. While this known iterative process is effective, vehicle assembly employing such trial and error process can be time consuming and inefficient.

SUMMARY OF THE INVENTION

It is an object of the invention to provide a fixture adapted for use on a convertible vehicle body, before installation of the convertible top, which facilitates adjustment of vehicle side glass from a baseline window set into a final position that will provide a desired window-to-top fit, thereby obviating the need for iterative side glass adjustment upon subsequent assembly of the convertible top on the vehicle body.

In accordance with an aspect of the invention, an apparatus is provided for setting a side glass in a convertible vehicle body prior to assembly of a convertible top on the vehicle body. The apparatus includes a fixture adapted to engage a plurality of locating points on the body, which preferably include such principal locating points as convertible top "touch down points" on the vehicle's header and rear deck-lid shelf which otherwise serve to position and secure the convertible top on the vehicle body, and locating apertures defined in the vehicle body. The fixture is further adapted to engage the side glass when the side glass is disposed in a baseline raised position relative to the vehicle body.

The apparatus further includes a plurality of sensors mounted on the fixture for detecting cross-car and up-down position of the side glass relative to the locating points; a processor in electronic communication with the sensors for receiving the detected cross-car and up-down position of the side glass; and a display panel in electronic communication with the processor for displaying a position of the side glass relative to a predetermined side glass target position. While the invention contemplates the use of any suitable display, in a preferred embodiment, the display includes an LED array whose multicolor lights readily illustrate the relative position of the raised side glass from the target position and, correlatively, provides immediate position feedback to an assembly operator with which the assembly operator can quickly set the side glass to the desired position, prior to assembly of the convertible top on the vehicle body.

From the foregoing, it will be appreciated that the invention advantageously permits adjustment of a convertible vehicle's side glass during vehicle body assembly, after the side glass is installed and raised to a baseline up-down and cross-car position, but before the convertible top is installed on the vehicle body.

Other objects, features, and advantages of the invention will be readily appreciated upon a review of the subsequent description of the preferred embodiment and the appended claims, taken in conjunction with the accompanying Drawings.

DETAILED DESCRIPTION OF THE PREFERRED EMBODIMENT

Figure 1:
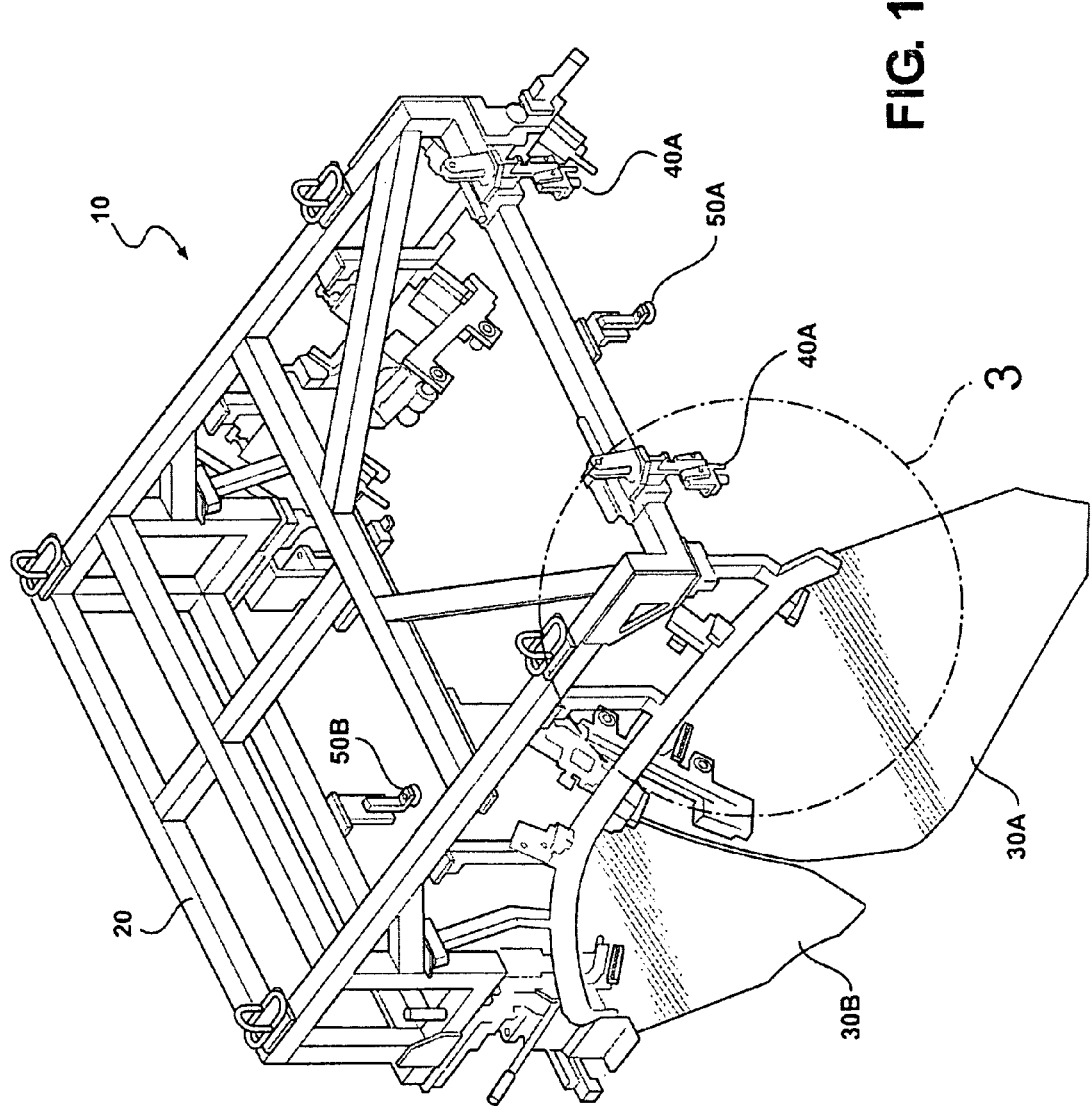
FIG. 1 is a computer image of a perspective front view of an exemplary vehicle side glass setting apparatus in accordance with the invention, including a fixture in contact with vehicle side windows (the side windows being shown only on one side of the fixture for simplicity)
Figure 2:
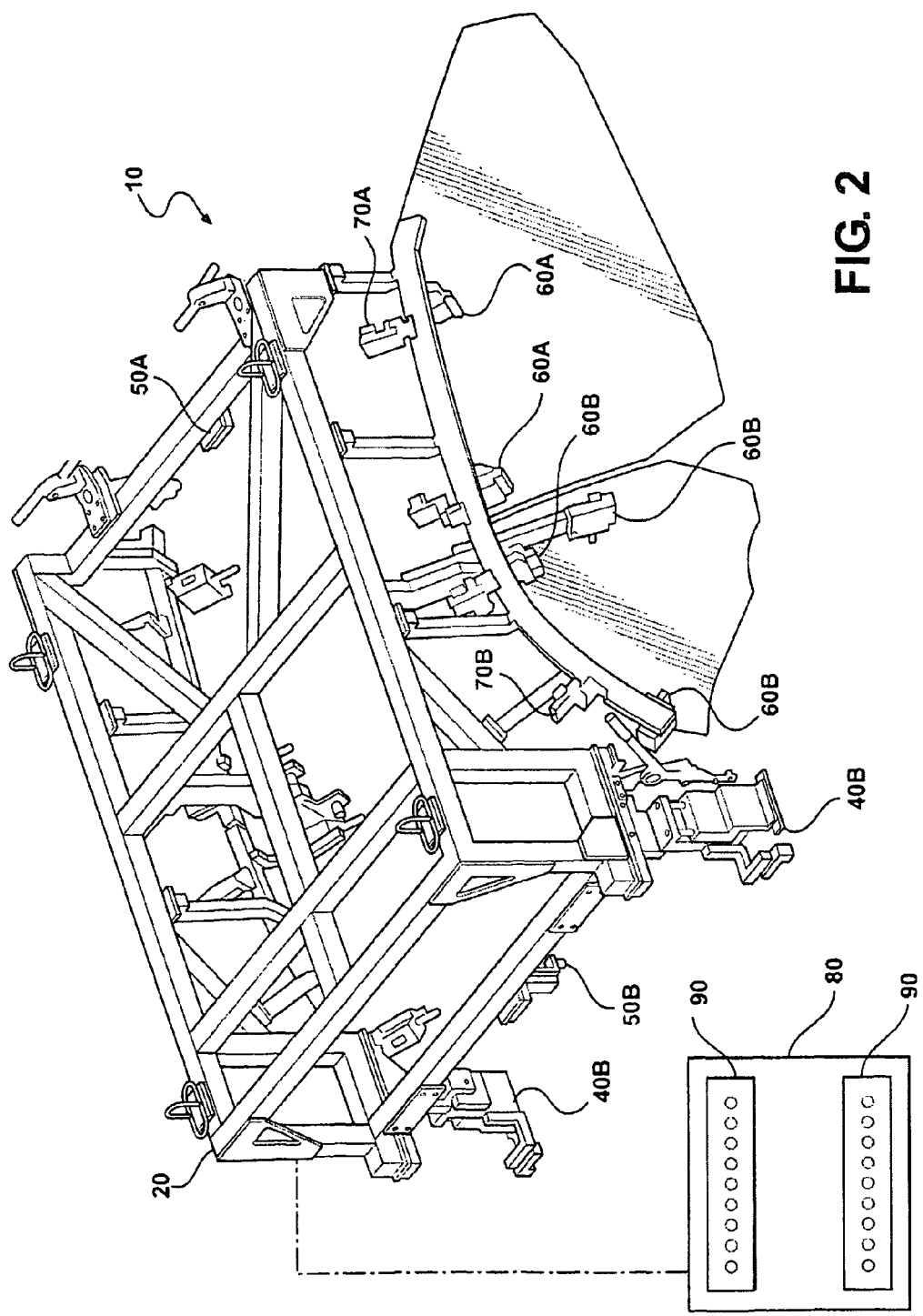
FIG. 2 is a computer image of a perspective rear view of the exemplary apparatus in contact with the vehicle side windows (the side windows again being shown only on one side of the fixture for simplicity), including a schematic of a processor with a display panel in electronic communication with sensors mounted on the fixture.
Figure 3:
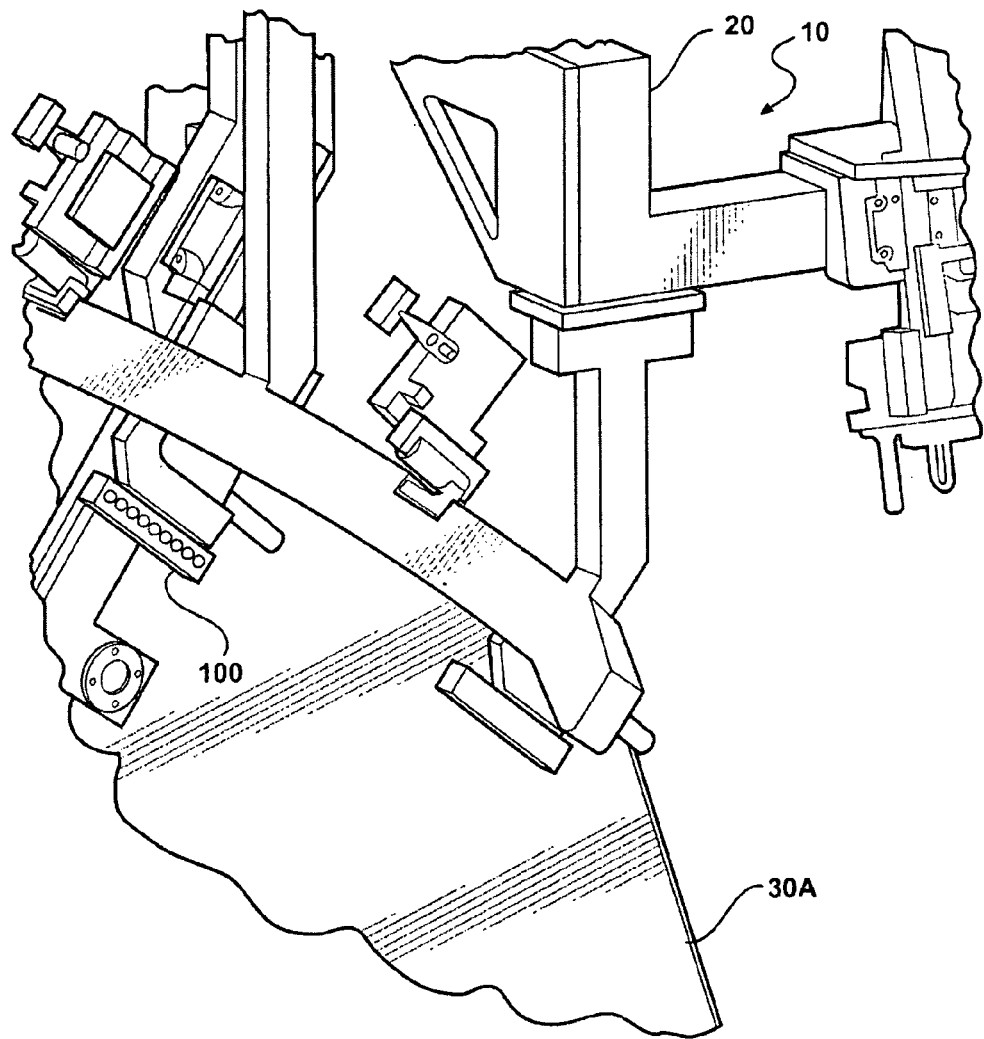
FIG. 3 is a computer image of an enlarged view of area A shown in FIG. 1, with a close-up of a display panel positioned at an individual sensor.

Referring to FIGS. 1-3, an exemplary apparatus 10 for setting the side glass of a convertible vehicle, such as the vehicle's door windows 30A and rear quarter windows 30B, prior to assembly of a convertible top (not shown) on the vehicle body, includes a fixture 20 adapted to engage the vehicle body in a plurality of locations on the vehicle body known in the industry as the convertible top's "principal locating points" (PLP's). By way of example only, for use with the exemplary apparatus 10, the PLP's may include touch-down points engaging along the same surfaces used to position and secure the vehicle's convertible top when the top is in its deployed state atop the vehicle body. The PLP's thus provide for the precise positioning of the fixture 20 to thereby allow the fixture to mimic engagement of the convertible top with the vehicle body.

Accordingly, as best seen in FIG. 1, the fixture 20 includes forward rest pads 40A adapted to engage a pair of touch-down points located on the vehicle header (not shown), i.e., an uppermost horizontal surface of the vehicle's windshield; and a forward locating pin 50A adapted to engage a header aperture that serves as part of the latch with which the convertible top is ultimately secured to the header (also not shown). As best seen in FIG. 2, the fixture 20 also includes rear rest pads 40B adapted to engage a pair of touch-down points located on the vehicle deck-lid shelf (not shown) near the vehicle's C-pillar, which typically constitutes a rear mounting surface for the convertible top; and a rear locating pin 50B adapted to engage an aperture in the vehicle deck lid. It will be appreciated that the invention contemplates the use of any suitable locating point by which to place the fixture 20 in a predetermined fixed position, both vertically and horizontally, relative to the vehicle body.

The fixture 20 also includes a plurality of sensors for detecting cross-car and up-down positioning of the side windows. While the invention contemplates use of any suitable contact and noncontact sensors, in the exemplary apparatus 10, the sensors are noncontact laser-type sensors. With the side windows 30A, 30B raised, the sensors are aimed at the side windows 30A, 30B to detect the windows' position relative to, the fixture's rest pads 40A,40B and locating pins 50A, 50B and, hence, relative to the convertible top's PLP's. As shown in FIG. 2, the fixture 20 of the exemplary apparatus 10 employs eight sensors on each side of the fixture 20e, for a total of sixteen sensors. Five sensors 60A, 60B are mounted on each of the left side and the right side of the fixture 20, to thereby detect the windows' cross-car position. Three sensors 70A, 70B are mounted on each of the left and the right sides of the fixture 20 to detect the windows' up-down position. The sensors 60A, 60B, 70A, 70B may also include spring-loaded stops (not shown) for contacting the corresponding side windows. The fixture 20 may also include gage blocks or other suitable reference surfaces (not shown) that are prepositioned relative to the target position, with which an assembly operator may quickly and directly visually characterize and confirm the relative position of the side glass with the target position.

Referring again to FIG. 1, the exemplary apparatus 10 also includes a processor 80 with a display panel 90 which receives the detected position data from the sensors 60A, 60B, 70A, 70B and visually displays positioning information for each individual side window 30A, 30B relative to a predetermined target window position. The windows' target position may be predetermined mathematically by utilizing a computer-aided design (CAD) system. The predetermined target position may alternatively represent a desired range of values, generally encompassing permissible vehicle assembly tolerances.

As best seen in FIG. 2, the display panel 90 may be arranged as a single stand-alone unit positioned remotely from but in electrical communication with the processor, or be incorporated with the processor into a single physical assembly. For convenience, the display panel may include a light emitting diode (LED) array by which to visually characterize the relative side glass position information to the assembly operator. By way of example, in the exemplary apparatus 10, the LED array includes a green color LED positioned in its center, at least one yellow color LED positioned on each side of the green LED, and at least one red color LED positioned on each side of the at least one yellow LED, as shown on the display panel 90 in FIG. 2. And, as best seen in FIG. 3, a separate display panel 100 may be provided at each individual sensor 60A, 60B, 70A, 70B and/or side window 30A, 30B to facilitate its use by an assembly operator in setting each side window 30A, 30B.

In use, the assembly operator is trained to interpret an illuminated green LED as a window position within the target range, illuminated yellow LEDs as a window position that is close to the target range, and illuminated red LEDs as a window position that is out of the target range. When the window position is detected and displayed on the display panel 90, 100, the operator's appropriate response is to manually manipulate adjustment screws for the respective window until the corresponding green LED is illuminated on the display 90, 100. The above process is followed for setting each side window, thereby assuring that the vehicle's side glass is positioned on target. The array may also utilize LED's of only two colors, where a number of green LED's in the center position are flanked on both sides by a number of red LED's. Using, for example, three green LED's in the center instead on one would provide a wider visual target range, which may make glass-setting less time consuming.

Thus, the exemplary apparatus 10 reliably determines the position of the side windows and advantageously aids in properly setting the side glass prior to assembly of the convertible top on the vehicle body, in order to achieve a dependable convertible top weather seal upon subsequent assembly of the convertible top on the vehicle body. The assembly of convertible automobiles using the exemplary apparatus 10 improves the efficiency of the glass setting process by eliminating trial and error, to thereby provide a more predictable assembly-process cycle time. A further benefit of the invention is the reduction in subsequent, post-assembly vehicle repair and rework.

While the above description constitutes the preferred embodiment, it will be appreciated that the invention is susceptible to modification, variation and change without departing from the proper scope and fair meaning of the subjoined claims.

What is claimed is:

1. An apparatus for setting a side glass in a convertible vehicle body prior to assembly of a convertible top on the vehicle body, the vehicle body including a plurality of locating points for positioning and securing the convertible top on the vehicle body, the apparatus comprising:
    a fixture adapted to engage the locating points and the side glass so as to mimic engagement of the convertible top with the vehicle body when the side glass is disposed in a baseline raised position relative to the vehicle body;
    a plurality of sensors mounted on the fixture for detecting cross-car and up-down position of the side glass relative to the locating points;
    a processor in electronic communication with the sensors for receiving the detected cross-car and up-down position of the side glass, the processor operative to generate position data of the side glass relative to a predetermined side glass target position; and
    a display panel in electronic communication with the processor for receipt of the position data, the display panel operative to display a position of the side glass relative to a predetermined side glass target position.

2. The apparatus of claim 1, wherein the display panel is disposed in proximity with the side glass.

3. The apparatus of claim 2, wherein the display panel includes an array of light-emitting diodes to visually characterize the relative position of the side glass from the target position.

4. The apparatus of claim 1, wherein the fixture includes a locating pin adapted to engage a respective one of the locating points.

5. The apparatus of claim 1, wherein the fixture includes a rest pad adapted to engage a respective one of the locating points.

* * * * *